(12) United States Patent
Nasar

(10) Patent No.: US 10,098,357 B1
(45) Date of Patent: Oct. 16, 2018

(54) BAKED GOOD INTERIOR REMOVAL DEVICE

(71) Applicant: Sheldon Nasar, Vienna, VA (US)

(72) Inventor: Sheldon Nasar, Vienna, VA (US)

( * ) Notice: Subject to any disclaimer, the term of this patent is extended or adjusted under 35 U.S.C. 154(b) by 0 days.

(21) Appl. No.: 15/472,993

(22) Filed: Mar. 29, 2017

(51) Int. Cl.
| | | |
|---|---|---|
| *A47J 25/00* | (2006.01) | |
| *A21C 15/00* | (2006.01) | |
| *B26B 27/00* | (2006.01) | |
| *B26D 3/06* | (2006.01) | |
| *A23P 10/00* | (2016.01) | |

(52) U.S. Cl.
CPC ............ *A21C 15/00* (2013.01); *A23P 10/00* (2016.08); *A47J 25/00* (2013.01); *B26B 27/00* (2013.01); *B26D 3/06* (2013.01)

(58) Field of Classification Search
CPC . A21C 15/00; B26B 27/00; B26D 3/06; A47J 25/00; A23P 10/00
USPC ........ 30/277.4, 113.1, 301, 302, 310, DIG. 7
See application file for complete search history.

(56) References Cited

U.S. PATENT DOCUMENTS

| | | | | | |
|---|---|---|---|---|---|
| 188,819 | A | * | 3/1877 | Renner | B26D 3/26 |
| | | | | | 30/302 |
| 443,056 | A | * | 12/1890 | Potterr | A01B 1/222 |
| | | | | | 172/25 |
| 917,660 | A | * | 4/1909 | Roberts | A47J 25/00 |
| | | | | | 294/50.7 |
| 3,937,850 | A | * | 2/1976 | Farha | A23N 4/12 |
| | | | | | 426/481 |
| 4,383,367 | A | * | 5/1983 | Mielnicki | B26B 3/04 |
| | | | | | 30/114 |
| 4,979,419 | A | * | 12/1990 | Sonkin | A21C 15/04 |
| | | | | | 30/113.1 |
| 5,033,193 | A | * | 7/1991 | Valenti | A47J 9/00 |
| | | | | | 30/124 |
| 5,157,836 | A | * | 10/1992 | Aulbers | A23N 4/20 |
| | | | | | 30/113.1 |
| 5,557,998 | A | * | 9/1996 | Schwartz | A21C 15/04 |
| | | | | | 269/13 |
| 5,699,725 | A | * | 12/1997 | Poltielov | A47J 25/00 |
| | | | | | 99/494 |
| 5,799,401 | A | * | 9/1998 | Gering | B26D 3/06 |
| | | | | | 30/113.2 |
| 5,852,875 | A | * | 12/1998 | Dolah | A47J 25/00 |
| | | | | | 15/22.1 |
| 5,920,991 | A | * | 7/1999 | Tracy | B26B 3/00 |
| | | | | | 30/278 |
| 6,769,186 | B1 | * | 8/2004 | Sakhleh | A47J 25/00 |
| | | | | | 248/37.3 |
| 9,204,750 | B1 | * | 12/2015 | Qussar | A47J 25/00 |
| D793,180 | S | * | 8/2017 | Christoforidou | D7/693 |
| 2005/0086814 | A1 | * | 4/2005 | Huang | A47J 43/0722 |
| | | | | | 30/302 |
| 2015/0052760 | A1 | * | 2/2015 | Keschner | A47J 43/288 |
| | | | | | 30/172 |

* cited by examiner

*Primary Examiner* — Hwei C Payer

(57) ABSTRACT

A baked good interior removal device facilitates removal of a soft interior of a baked good from an outer crust. The device includes a handle and an axle extending from the handle. A motor positioned within the handle selectively rotates the axle relative to the handle. A head is coupled to the axle. The head includes a cylindrical wall and a plurality of scoops extending outwardly from the cylindrical wall for engaging and removing an interior of a baked good from an exterior of the baked good as the head is rotated.

8 Claims, 4 Drawing Sheets

BAKED GOOD INTERIOR REMOVAL DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to removal devices and more particularly pertains to a new removal device for facilitating removal of a soft interior of a baked good from an outer crust.

BRIEF SUMMARY OF THE INVENTION

An embodiment of the disclosure meets the needs presented above by generally comprising a handle and an axle extending from the handle. A motor positioned within the handle selectively rotates the axle relative to the handle. A head is coupled to the axle. The head includes a cylindrical wall and a plurality of scoops extending outwardly from the cylindrical wall for engaging and removing an interior of a baked good from an exterior of the baked good as the head is rotated.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
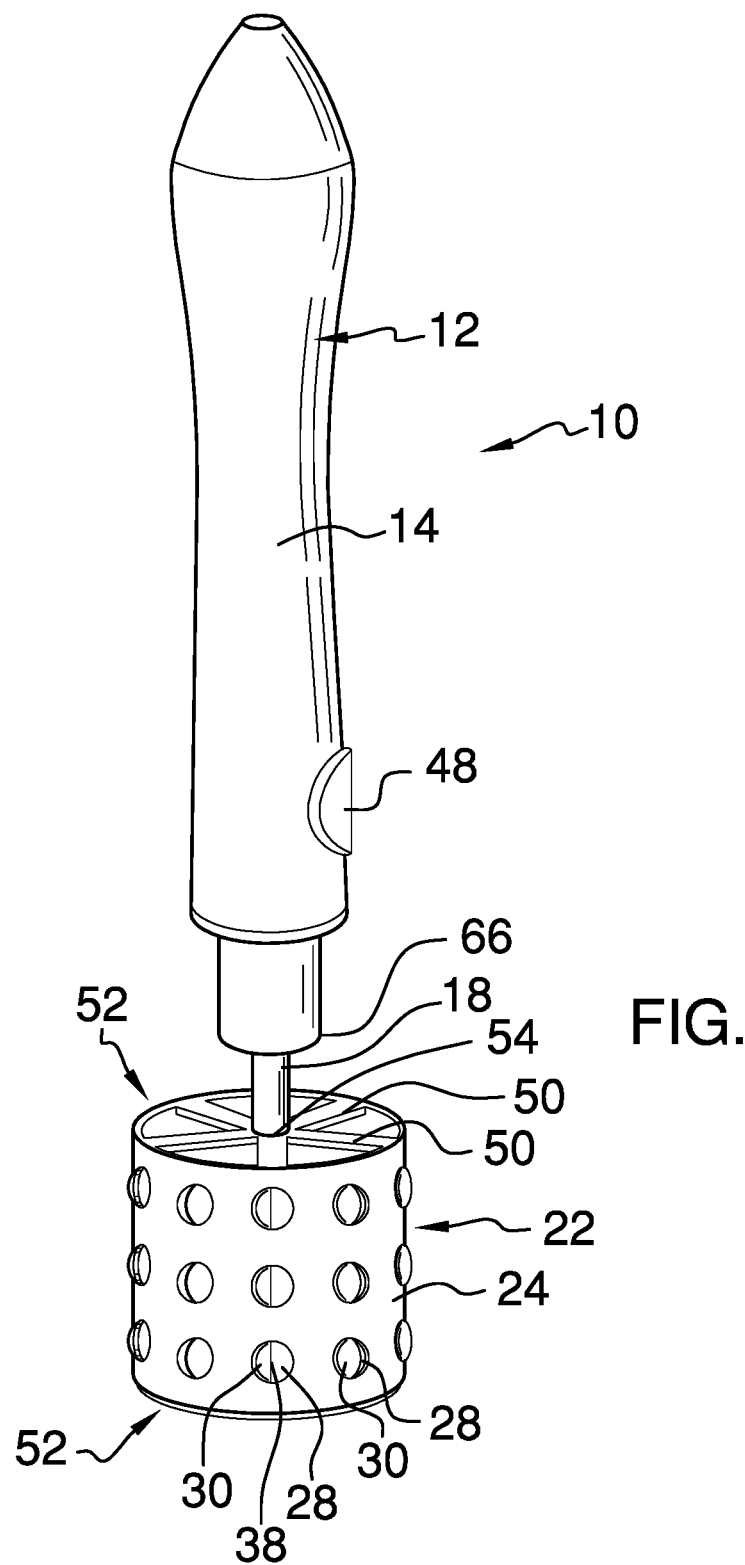
FIG. 1 is a top front side perspective view of a baked good interior removal device according to an embodiment of the disclosure.
Figure 2:
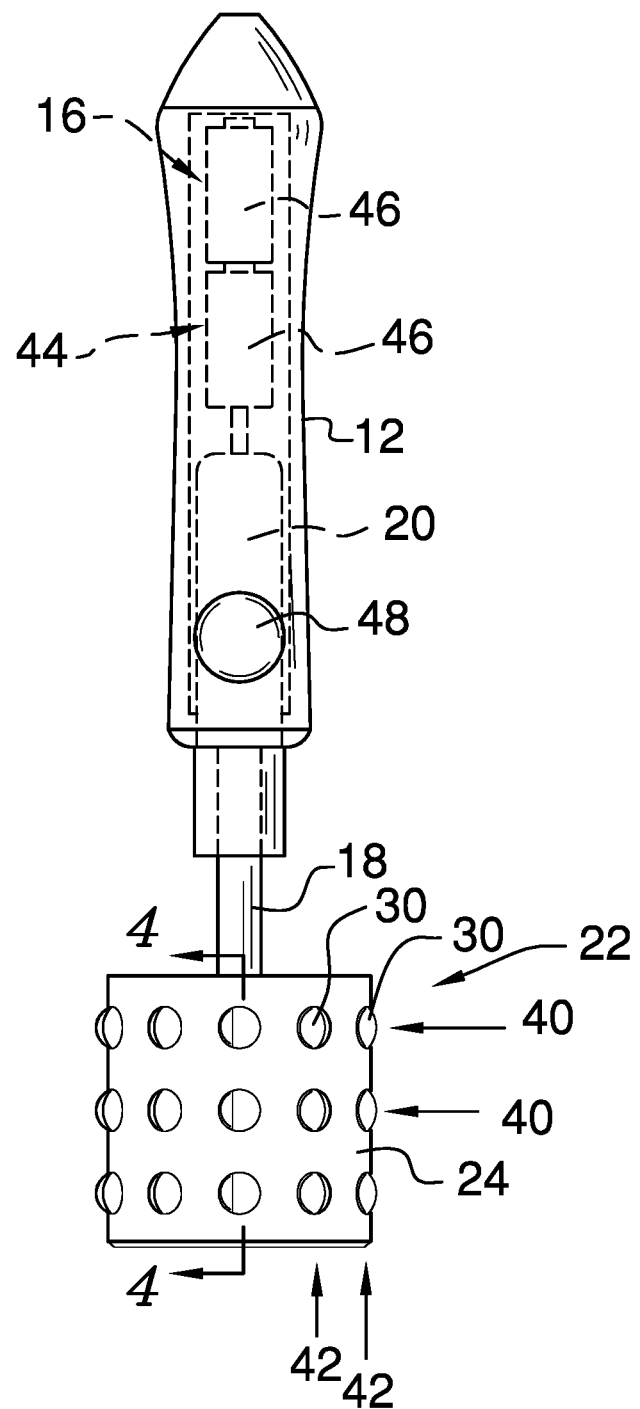
FIG. 2 is a front view of an embodiment of the disclosure.
Figure 3:
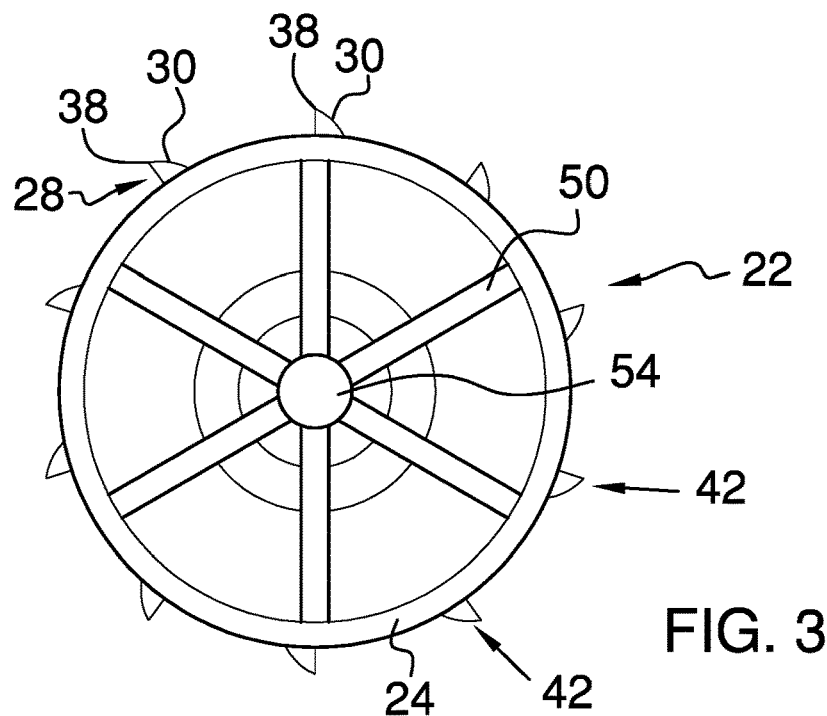
FIG. 3 is a bottom view of an embodiment of the disclosure.
Figure 4:
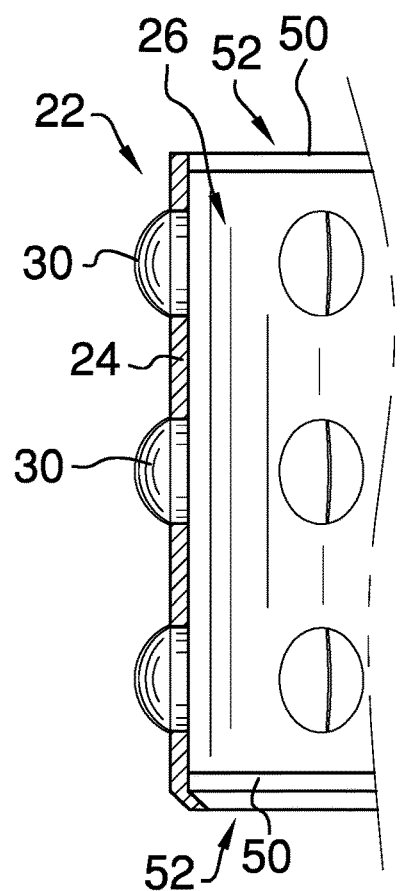
FIG. 4 is a cross-sectional view of an embodiment of the disclosure taken along line 4-4 of FIG. 2.
Figure 5:
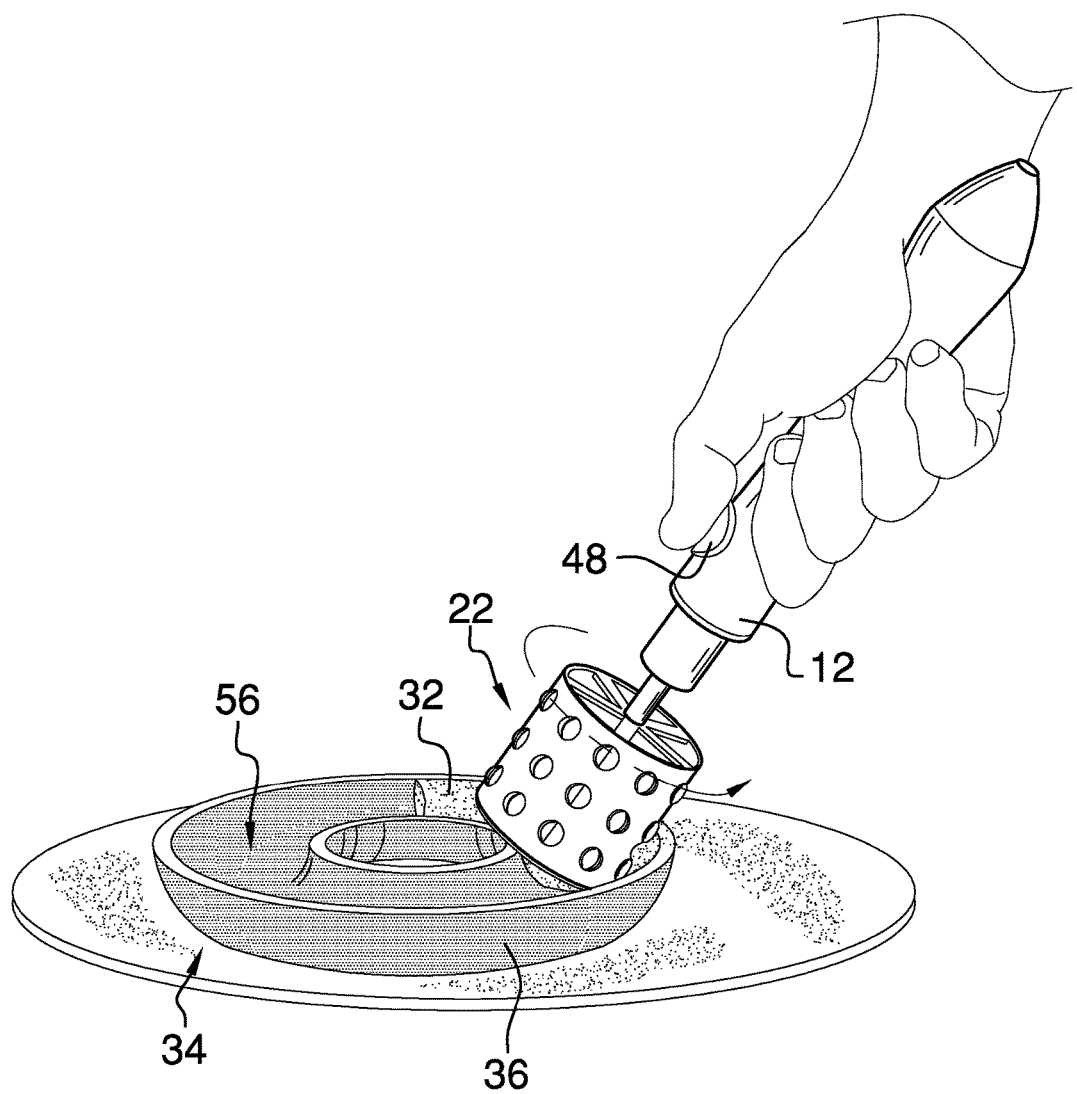
FIG. 5 is a top front side perspective view of an embodiment of the disclosure in use.

With reference now to the drawings, and in particular to FIGS. 1 through 5 thereof, a new removal device embodying the principles and concepts of an embodiment of the disclosure and generally designated by the reference numeral 10 will be described.

As best illustrated in FIGS. 1 through 5, the baked good interior removal device 10 generally comprises a handle 12. The handle 12 is elongated having a perimeter wall 14 defining an interior 16 of the handle 12. An axle 18 is coupled to the handle 12 such that the axle 18 extends from the handle 12. The axle 18 is aligned along a longitudinal axis of the handle 12. A motor 20 is positioned within the handle 12. The motor 20 may be positioned adjacent to a first end 66 of the handle 12 from which the axle 18 extends. The motor 20 is operationally coupled to the axle 18 and selectively rotates the axle 18 relative to the handle 12.

A head 22 is coupled to the axle 18 such that rotation of the axle 18 rotates the head 22. The head 22 may be removable from the axle 18 or the axle 18 may be incorporated into the head 22 and removable from the motor 20 and handle 12 with the head 22. The head 22 includes a cylindrical wall 24 defining a hollow interior space 26 of the head 22. The cylindrical wall 24 is spaced from a central core 54 of the head 22 by a plurality of spokes 50. The spokes 50 are spaced to provide access to the interior space 26 through each end 52 of the head 22. Each of a plurality of openings 28 extends through the cylindrical wall 24. Each of a plurality of scoops 30 is coupled to and extends outwardly from the cylindrical wall 24 wherein each scoop 30 is configured for engaging and removing an interior 32 of a baked good 34, such as a bagel or the like, from an exterior 36 of the baked good 34 as the head 22 is rotated.

Each of the scoops 30 is positioned in communication with an associated one of the openings 28 wherein each scoop 30 is configured for engaging and removing the the interior 32 of the baked good 34 from the exterior 36 of the baked good 34 such that the interior 32 is passed through the associated opening 28 as the head 22 is rotated. Each of the scoops 30 has a leading edge 38 extending radially outward from the cylindrical wall 24. The scoops 30 are arranged into a plurality of rows 40. Each of the rows 40 forms a circle around the cylindrical wall 24. The rows 40 are spaced apart and each row 40 is perpendicular to the axle 18. The scoops 40 are further arranged into a plurality of columns 42. The columns 42 are spaced radially around the cylindrical wall 24. Each of the columns 42 is coplanar with the axle 18.

A power source 44 is positioned within the handle 12. The motor 20 is electrically coupled to the power source 44. The power source 44 may be a battery 46 or a plurality of batteries. The battery 46 may be rechargeable by engaging the battery 46 to an extrinsic power source relative to the handle 12 while the battery 46 is either removed from the handle 12 or while the battery 46 remains in the handle 12. Alternatively, the power source 44 may be provided by direct connection to the extrinsic power source using a conventional cord. A button 48 is positioned on the handle 12. The button 48 is operationally coupled between the power source 44 and the motor 20 wherein manipulation of the button 48 activates the motor 20 to rotate the head 22. The motor 20 may have a plurality of speeds and manipulation of the button 48 may control activation of the motor 20 as well as selection of a desired rotational speed for the axle 18 as provided by the motor 20.

In use, the baked good 34 is sliced open to provide access to the interior 32 of the baked good 34. The handle 12 is grasped and the head 22 applied into contact with the interior 32 of the baked good 34. Rotation of the head 22 causes the scoops 30 to engage and separate the interior 32 from the exterior 36 of the baked good 34. A desired amount of the interior 32 may be removed. In the case of the baked good 34 being a bagel, removal of the interior 32 after conventional slicing will produce a trough 56 within the bagel suitable for holding a filling such as cream cheese, meats, vegetables, or other condiments. The interior 32 may also be removed to allow for reduced calorie consumption.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A baked good interior removal device comprising:
   a handle;
   an axle extending from said handle;
   a motor positioned within said handle, said motor selectively rotating said axle relative to said handle;
   a head coupled to said axle such that rotation of said axle rotates said head, said head comprising
      a cylindrical wall, said cylindrical wall defining a hollow interior space of said head, and
      a plurality of scoops being coupled to and extending outwardly from said cylindrical wall wherein each of said scoops is configured for engaging and removing an interior of a baked good from an exterior of the baked good as said head is rotated;
   a plurality of openings extending through said cylindrical wall; and
   each of said scoops being positioned in communication with an associated one of said openings wherein each of said scoops is configured for engaging and removing the interior of the baked good from the exterior of the baked good such that the interior is passed through said associated opening as said head is rotated.

2. The device of claim 1, further comprising each of said scoops having a leading edge, said leading edge extending radially outward from said cylindrical wall.

3. The device of claim 1, further comprising said scoops being arranged into a plurality of rows, each of said rows forming a circle around said cylindrical wall, said rows being spaced apart, each said row being perpendicular to said axle.

4. The device of claim 1, further comprising said scoops being arranged into a plurality of columns, said columns being spaced radially around said cylindrical wall, each of said columns being coplanar with said axle.

5. The device of claim 1, further comprising a power source, said power source being positioned within said handle, said motor being electrically coupled to said power source.

6. The device of claim 5, further comprising said power source being a battery.

7. The device of claim 5, further comprising a button positioned on said handle, said button being operationally coupled between said power source and said motor wherein manipulation of said button activates said motor to rotate said head.

8. A baked good interior removal device comprising:
   a handle;
   an axle extending from said handle;
   a motor positioned within said handle, said motor selectively rotating said axle relative to said handle;
   a head coupled to said axle such that rotation of said axle rotates said head, said head comprising
      a cylindrical wall, said cylindrical wall defining a hollow interior space of said head,
      a plurality of openings extending through said cylindrical wall, and
      a plurality of scoops being coupled to and extending outwardly from said cylindrical wall wherein each of said scoops is configured for engaging and removing an interior of a baked good from an exterior of the baked good as said head is rotated, each of said scoops being positioned in communication with an associated one of said openings wherein each of said scoops is configured for engaging and removing the interior of the baked good from the exterior of the baked good such that the interior is passed through said associated opening as said head is rotated, each of said scoops having a leading edge, said leading edge extending radially outward from said cylindrical wall, said scoops being arranged into a plurality of rows, each of said rows forming a circle around said cylindrical wall, said rows being spaced apart, each said row being perpendicular to said axle, said scoops being arranged into a plurality of columns, said columns being spaced radially around said cylindrical wall, each of said columns being coplanar with said axle;

a power source, said power source being positioned within said handle, said motor being electrically coupled to said power source, said power source being a battery; and a button positioned on said handle, said button being operationally coupled between said power source and said motor wherein manipulation of said button activates said motor to rotate said head.

\* \* \* \* \*